United States Patent [19]

Bakassian et al.

[11] 3,884,957
[45] May 20, 1975

[54] PROCESS FOR THE PREPARATION OF NITRILES FROM ACIDS AND ORGANOSILYAMINES

[75] Inventors: Georges Bakassian; Marcel Lefort, both of Caluire, Rhone, France

[73] Assignee: Rhone-Poulenc, S.A., Paris, France

[22] Filed: Feb. 21, 1974

[21] Appl. No.: 444,680

Related U.S. Application Data

[63] Continuation of Ser. No. 223,301, Feb. 3, 1972, abandoned.

[30] Foreign Application Priority Data

Feb. 4, 1972  France .............................. 72.03791

[52] U.S. Cl. ... 260/465 B; 260/283 CN; 260/294.9; 260/319.1; 260/326.62; 250/464; 260/448.2 N; 260/448.8 A; 260/465.2
[51] Int. Cl. ......................................... C07c 121/02
[58] Field of Search .............. 260/465.2, 464, 465 B

[56] References Cited
UNITED STATES PATENTS
3,734,942    5/1973    Dennis ............................... 260/465

*Primary Examiner*—Lewis Gotts
*Assistant Examiner*—Dolph H. Torrence
*Attorney, Agent, or Firm*—Stevens, Davis, Miller & Mosher

[57] ABSTRACT

Nitriles are prepared from carboxylic acids in a single stage and in high yield by heating the acid with a primary silylamine or linear of cyclic silazane containing a

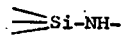

group in the presence of a Lewis acid. Aliphatic, aromatic and heterocyclic nitriles are prepared using hexamethyldisilazane or polydimethylcyclosilazane and aluminium or zinc chloride.

8 Claims, No Drawings

PROCESS FOR THE PREPARATION OF NITRILES FROM ACIDS AND ORGANOSILYAMINES

This is a continuation of application Ser. No. 223,301, filed Feb. 3, 1972, now abandoned.

The present invention relates to a process for converting organic carboxylic acids into nitriles in one stage.

A process is already known using an alkali thiocyanate which proceeds in a single-stage, but achieves only conversion of half the acid employed, into nitrile, the other half of the acid remaining in the form of an alkali salt. Furthermore, this process only gives very low yields of nitriles where the acid contains a small number of carbon atoms. It is for this reason necessary to employ processes during which the acid is first converted either into the anhydride, acid chloride or ester derivative, these derivatives being thereafter converted into the amide. The amide is then converted to the nitrile either thermally or by means of a dehydrating agent. It is also possible to avoid going through one of the intermediates mentioned above by directly converting the ammonium salt into a nitrile by heating. However, with certain acids of low stability, the yields are low because of decarboxylation.

The present invention provides a process for the preparation of a nitrile from a carboxylic acid in a single stage, wherein a carboxylic acid is reacted with a primary silylamine or linear or cyclic silazane hving a Si—NH— group, in the presence of a Lewis acid as the catalyst.

The process of this invention enables nitriles to be obtained in a single stage and in high yields. In particular, the yields are satisfactory even if the acids have a small number of carbon atoms, unlike the thiocyanate method and even if the acids have a pronounced tendency to decarboxylate thermally.

The acids to be used can be monoacids or polyacids. Apart from the —COOH group, the residue of the acid can be purely hydrocarbon in nature or it can contain various atoms or groups of atoms which can be either inert towards organosilylamines and carboxyl groups under the reaction conditions or can be more or less reactive and can be converted into other groups. An example of such reactive a group is the phenolic hydroxy group in a phenolic carboxylic acid which is converted into a siloxy group at the same time as the carboxy group is converted to nitrile.

Amongst the monoacids which can be converted into nitriles by the process of the invention are, those of the formula R'COOH, where R' is a straight or branched alkyl group having 1 to 12 carbon atoms, a cycloalkyl group with 5 to 12 ring carbon atoms which is unsubstituted or substituted by alkyl radicals, containing up to 12 carbon atoms. R' may also contain unsaturated carbon-carbon bonds, or be a phenyl, alkylphenyl or phenylalkyl group, (the alkyl residues having 1–12 carbon atoms), which may optionally contain one or more hydroxyl groups in a juxta-nuclear position to the carboxy group. R' may also be a monovalent group derived from a heterocyclic compound with 5 or 6 ring atoms in which the heteroatom is N, O or S, or an aromatic radical consisting of a chain of at least two benzene rings bonded to one another by a valency bond and/or by an alkylene group having 1–6 carbon atoms. The benzene rings can also partially or completely be present in the form of an orthocondensed ring system, e.g. naphthalene, anthracene etc. Preferably, the number of benzene rings bonded together or ortho-condensed together is 2 to 3.

Polyacids which may be converted to nitriles in accordance with the present invention are, for example, dicarboxylic or tricarboxylic acids in which the multivalent radical to which the carboxyl groups are attached is derived from one of the monovalent groups R' mentioned above, by removal of one or two hydrogen atoms carried by carbon atoms.

Specific monocarboxylic acids which may be used in the present invention are: acetic, butyric, valeric or n-decanoic acids; cyclohexanecarboxylic acid, benzoic acid, p-methylbenzoic acid, p-hydroxybenzoic acid, phenylacetic acid, 2-hydroxy-4-methyl-benzoic acid, nicotinic acid, isonicotinic acid, 2-carboxy-pyrrole, 1-carboxy-naphthalene, carboxy-biphenyl, 2-carboxy-benzopyrrole or 4-carboxy-quinoline.

Specific di- and tri-carboxylic acids which may be used in the present invention are malonic acid, succinic acid, adipic acid, cyclohexane-1,4-dicarboxylic acid, isophthalic or terephthalic acid, 2,4-dicarboxypyridine, 4,6-dicarboxyquinoline, 4,4'-dicarboxy-diphenyl, 4,4'-dicarboxy-diphenylmethane, trimesic acid or 3,5-dicarboxyphenol.

The primary silylamines or the linear or cyclic silazanes which are of particular interest for use in the present process are organosilylamines of the general formulae:

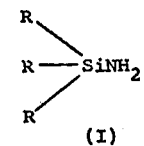

(I)

or

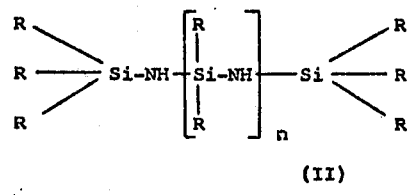

(II)

or

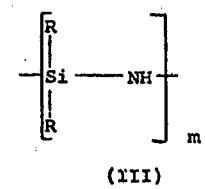

(III)

In these formulae the symbols R, which may be identical or different, each represent straight or branched alkyl groups having 1 – 12 carbon atoms, cycloalkyl groups with 5 or 6 ring carbon atoms or phenyl, alkylphenyl or phenylalkyl groups where the alkyl residues contain 1–12 carbon atoms. The symbol $n$ represents 0 or an integer which is generally not greater than 100 and $m$ represents an integer which is 3, 4 or 5.

It is also possible, in carrying out the process of the invention, to use other organosilylamines of the formulae (I), (II) or (III) in which R represents a saturated or unsaturated hydrocarbon group which may, if desired be substituted by atoms or groups of atoms which are chemically inert under the process conditions. However in practice, for reasons of simplicity, it is preferred to carry out the invention using hexamethyldisilazane or a polydimethylcyclosilazane.

Formation of the nitrile in the process of the invention is accompanied by the formation of a siloxane or a cyclopolysiloxane as well as of ammonia. The process is carried out in the presence of a Lewis acid, which may be a metal or metalloid halide or a metal or metalloid oxide or sulphide of acid character. Lewis acids which may be used in the process include aluminium chloride, zinc chloride, cadmium or beryllium chloride, stannic chloride, antimony pentachloride, titanium tetrachloride, ferric chloride, boron trifluoride and oxides and sulphides such as BeO, $Cr_2O_3$, $P_2O_5$, $TiO_2$, $ThO_2$, $Al_2O_3$, $Fe_2O_3$, $Cr_2O_3$, $V_2O_3$, $MoS_2$ and $MoS_3$ [see Georges A. OLAH, Friedel-Crafts and related reactions, Volume I, page 203 (1963)].

The reactants can be used in varying proportions. In practice, to achieve as complete a conversion as possible of the acid into the nitrile, an excess of organosilylamine is used relative to the stoichiometric requirements of the reaction. The stoichiometry requires two aminosilyl groups per carboxyl group, and the proportion of the aminosilyl groups relative to the carboxyl groups is advantageously between 2 and 4. When the process is applied to acids containing a group other than the carboxyl group which can react with silylamines, it is obviously necessary to increase the proportion of organosilylamine to allow for the reaction of the silylamine with these groups.

The amount of Lewis acid catalyst employed is not critical; it can advantageously be between 0.1 and 5 percent by weight of the total weight of the reactants.

The process of the invention may be advantageously carried out by heating the mixture of the reactants with the catalyst to a temperature of 100° to 300°C, the temperature preferably being above 200°C so as to achieve a sufficiently high rate of reaction. The process can be carried out under atmospheric pressure if the reactants as well as the reaction products are of low volatility. In the converse is the case, it is necessary to carry out the reaction in a closed vessel.

At the end of the reaction, after having cooled the mixture and released the ammonia gas if necessary, the nitriles can be isolated by any known means, e.g., distillation. Distillation of the nitrile also makes it possible to isolate the disiloxanes or polycyclosiloxanes, formed during the reaction, in the pure state. These siloxanes can be used for numerous applications which are well-known in organosilicon chemistry.

If the reaction is applied to a phenol carboxylic acid, the resulting nitrile in which the phenolic hydroxy group is converted into a siloxy group can be isolated by distillation. Thereafter, the siloxy group may be hydrolysed at ambient temperature to give the phenolic nitrile. It is also possible to hydrolyse the initial reaction mixture directly and to collect the phenolic nitrile by distillation or by precipitation.

The Examples which follow illustrate the invention.

EXAMPLE 1

73 g of polydimethylcyclosilazane and 1 g of aluminium chloride are introduced into a 250 cm³ flask and 30 g of acetic acid are then added over the course of 15 minutes. Ammonia is copiously evolved, and the reactants are then progressively heated to the reflux temperature at atmospheric pressure (76°C), reflux is maintained for 30 minutes and 15 g of a first fraction (boiling point 76°–80°C), containing 90 percent of acetonitrile, is distilled slowly, followed by a second fraction of 10 g of hexamethylcyclotrisiloxane. During refluxing, the temperature rises from 166° to 210°C.

The polydimethylcyclosilazane used as a reactant, which is obtained by reaction of ammonia with dimethyldichlorosilane in cyclohexane at 50°C, essentially consists of cyclotrisilazane and cyclotetrasilazane in substantially equal proportions.

EXAMPLE 2

41 g of phenylacetic acid, 105 g of hexamethyldisilazane and 1 g of aluminium chloride are introduced into a 250 cm³ autoclave. The reactants are heated to 230°C for 40 minutes and the pressure rises to 37 bars. After cooling and releasing the gas, the contents of the autoclave are decanted. The upper layer contains 133 g of hexamethyldisiloxane. Distillation of the lower layer yields 28 g of a fraction (boiling point 0.1 : 56°–57°C) of pure phenylacetonitrile.

EXAMPLE 3

55 g of salicylic acid, 161 g of hexamethyldisilazane and 2 g of zinc chloride are introduced into a 500 cm³ autoclave. The reactants are heated to 185°C for 5 hours, during which time a pressure of 44 bars develops in the autoclave. Distillation of the reaction products yields 72 g of a first fraction (boiling point 98°C) comprising hexamethyldisiloxane, and 48 g of a second fraction (boiling point 0.7 : 110°–111°C) comprising o-trimethylsiloxybenzonitrile. Hydrolysis of this last mentioned compound, followed by a distillation, yields 27 g of pure o-hydroxybenzonitrile (melting point : 98°C) and 19 g of hexamethyldisiloxane.

EXAMPLE 4

92 g of p-hydroxybenzoic acid, 300 g of hexamethyldisilazane and 0.5 g of aluminium chloride are introduced into a 1 l autoclave and the reactants are heated to 250°C over the course of 1 hour 30 minutes. The reaction mixture is then hydrolysed by stirring with 100 g of water and 74.5 g of phydroxybenzonitrile (melting point : 111°C) are recovered by filtration. 270 g of hexamethyldisiloxane are also isolated by decantation.

EXAMPLE 5

27.5 g of p-hydroxybenzoic acid, 45 g of polydimethylcyclosilazane (prepared as described in Example 1) and 0.5 g of aluminium chloride are introduced into a 250 cm³ flask. The reactants are heated to 235°C over the course of 1 hour 30 minutes, at which temperature the evolution of ammonia ceases. After cooling, 100 cm³ of water are added, followed by 5 cm³ of hydrochloric acid (d : 1.19) added gradually to neutralise the mixture. The mixture is taken up in ether, the ether layer separated off, the ether is removed and 60 cm³ of cyclohexane are added. 4-Hydroxy-benzonitrile precipitates and 21.5 g are collected by filtration. The cyclohexane is removed from the filtrate by distillation and 41 g of siloxane oil are obtained.

EXAMPLE 6

24.6 g of isonicotinic acid, 37 g of polydimethylcyclosilazane (prepared as described in Example 1) and 0.5 g of aluminium chloride are introduced into a 250 cm³ flask and heated to 220°C for 4 hours. After hydrolysis with 100 cm³ of water, extraction with ether and removal of this solvent, 60 cm³ of cyclohexane are added to the residue. The 4-cyanopyridine formed precipitates and 10 g of this product (melting point : 81°C) are isolated by filtration. 31 g of polydimethylcyclosiloxane are obtained from the filtrate after the cyclohexane is distilled.

EXAMPLE 7

41.5 g of terephthalic acid, 170 g of hexamethyldisilazane and 1 g of aluminium chloride are introduced into a 500 cm³ flask, the reactants are heated to the reflux temperature and heating is continued until the evolution of ammonia ceases. The contents of the flask are then poured into a 500 cm³ autoclave and heated to 270°C over the course of 1 hour 30 minutes. The pressure rises to 41 bars. After cooling, the reaction mixture is filtered; 145 g of hexamethyldisiloxane, and a precipitate which is washed with ether, are obtained. This precipitate (melting point : 220°C), which weighs 18 g, is terephthalonitrile.

I claim:

1. A process for the preparation of a nitrile from a carboxylic acid wherein a carboxylic acid of formula $R'(COOH)_p$ is reacted with a primary silylamine or linear or cyclic silazane having the general formula:

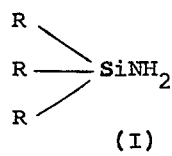

or

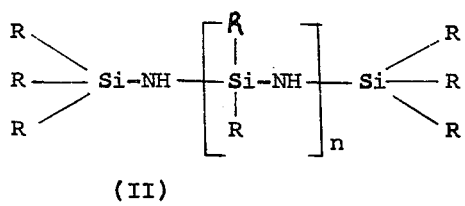

or

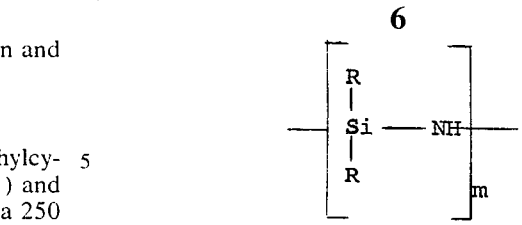

in the presence of a Lewis acid as catalyst wherein $p$ is 1, 2 or 3, R' is a straight or branched alkyl or alkenyl group having 1–12 carbon atoms, a cycloalkyl or cycloalkenyl group with 5–12 ring carbon atoms which is unsubstituted or substituted by alkyl radicals containing up to 12 carbon atoms, or is a phenyl, alkylphenyl or phenylalkyl group, where the alkyl residue contains 1–12 carbon atoms and where the phenyl residue is unsubstituted or is substituted by one or more hydroxyl groups in a juxta-nuclear position to the carboxy group, or is a monovalent group derived from a heterocyclic compound with 5 or 6 ring atoms in which the hetero atom is N, O or S, or is an aromatic radical consisting of a chain of at least 2 benzene rings where each benzene ring is bonded to the adjacent benzene ring by a direct valency bond or by an alkylene group having 1–6 carbon atoms, or R' is a divalent or trivalent radical obtained by the removal of one or two hydrogen atoms respectively bonded to carbon atoms in the monovalent radical R' as defined above: the symbols R, which may be the same or different, each represent an alkyl, alkylphenyl or phenylalkyl group where the alkyl group or portion is straight or branched and contains 1–12 carbon atoms or a cycloalkyl group of 5–6 ring carbon atoms or a phenyl group $n=o$ or an integer of 1–100 and $m=3$, 4 or 5.

2. A process according to claim 1 wherein the silylamine or silazane is hexamethyldisilazane or a polydimethylcyclosilazane.

3. A process according to claim 1 wherein the amounts of acid and silylamine or silazane is such that there is more than two aminosilyl groups available per carboxylic acid group.

4. A process according to claim 1 wherein the Lewis acid is aluminium chloride or zinc chloride.

5. A process according to claim 1 wherein 0.1 – 5.0 percent by weight of Lewis acid is used based on the total weight of reactants.

6. A process according to claim 1 wherein the reactants are heated to 200°–300°C.

7. A process according to claim 1 wherein R' is a hydroxyphenyl radical and the siloxy group in the resulting siloxy substituted benzo nitrile is hydrolysed to give the hydroxy substituted benzo nitrile.

8. A process according to claim 1, wherein the carboxylic acid is acetic, phenylacetic, salicyclic, p-hydroxybenzoic, isonicotinic or terephthalic acid.

* * * * *

UNITED STATES PATENT OFFICE
CERTIFICATE OF CORRECTION

Patent No. 3,884,957          Dated July 31, 1975

Inventor(s) Georges BAKASSIAN et al

It is certified that error appears in the above-identified patent and that said Letters Patent are hereby corrected as shown below:

On the Cover Sheet, item [30] should read:

"[30] Foreign Application Priority Data
Feb. 4, 1971 France...71.03791."

Signed and Sealed this fourteenth Day of October 1975

[SEAL]

Attest:

RUTH C. MASON
Attesting Officer

C. MARSHALL DANN
Commissioner of Patents and Trademarks